United States Patent
Wagner

(10) Patent No.: US 7,517,590 B2
(45) Date of Patent: Apr. 14, 2009

(54) METAL BAND AS INLAY FOR TRIM STRIPS OR SEALING STRIPS

(75) Inventor: Joachim Wagner, Neckarwestheim (DE)

(73) Assignee: BFC Buro-und Fahrzeugtechnik GmbH & Co. Prod. KG, Remseck (Aldingen) (DE)

( * ) Notice: Subject to any disclaimer, the term of this patent is extended or adjusted under 35 U.S.C. 154(b) by 152 days.

(21) Appl. No.: 11/274,077

(22) Filed: Nov. 15, 2005

(65) Prior Publication Data

US 2006/0185132 A1  Aug. 24, 2006

(30) Foreign Application Priority Data

Feb. 22, 2005  (DE) .................. 20 2005 002 832 U

(51) Int. Cl.
  B32B 3/24  (2006.01)
  B32B 3/02  (2006.01)
  B21D 25/00  (2006.01)
  B21D 28/26  (2006.01)
  B21B 5/00  (2006.01)

(52) U.S. Cl. .................. 428/573; 428/596; 428/597; 428/601; 52/670; 52/671

(58) Field of Classification Search .............. None
  See application file for complete search history.

(56) References Cited

U.S. PATENT DOCUMENTS 4,745,665 A * 5/1988 Hilsenbeck .................. 24/295
5,199,142 A * 4/1993 Davis .......................... 29/6.1
5,302,466 A * 4/1994 Davis et al. ................. 428/573
5,651,218 A * 7/1997 Bright et al. ............... 49/490.1
5,783,312 A * 7/1998 Laughman et al. .......... 428/573
6,079,160 A * 6/2000 Bonds ....................... 49/490.1
6,447,928 B2 * 9/2002 Suitts ......................... 428/573

* cited by examiner

Primary Examiner—Jennifer McNeil
Assistant Examiner—Jason L Savage
(74) Attorney, Agent, or Firm—Gifford, Krass, Sprinkle, Anderson & Citkowski, P.C.

(57) ABSTRACT

A metal band inlay for trim strips or sealing strips of flexible material that is bent to form a section. The metal band includes a plurality of edge slots in the longitudinal direction, which are guided inwardly from an edge of the metal band transversely to the longitudinal direction. The edge slots are wedge shaped. Central slots run to a tip toward their respective two ends and are arranged between the sequential edge slots. The central slots extend transversely to the longitudinal direction, but do not extend up to the edge. To simplify the cutting, the metal band further includes throughcuts that extend transversely to the longitudinal direction of the metal band, that correspond to at least some of the central slots and that extend from at least one edge of the metal band in the direction toward the tip of the respective central slot disposed opposite to the edge.

14 Claims, 2 Drawing Sheets

METAL BAND AS INLAY FOR TRIM STRIPS OR SEALING STRIPS

CROSS-REFERENCE TO RELATED APPLICATIONS

This application claims the benefit of German Utility Model No. DE 20 2005 002 832.0, filed on Feb. 22, 2005, the disclosure of which is incorporated herein by reference.

FIELD OF THE INVENTION

The present invention relates to a metal band as an inlay for trim strips or sealing strips of flexible material, in particular of rubber or plastic, which is in particular bent to form a section, having a plurality of slots, in particular periodically sequential slots in the longitudinal direction of the band which are inwardly guided from one edge of the metal band transversely to its longitudinal direction, which are wedge shaped or which run out inwardly in wedge shape, and central slots which run out to a tip at their two ends, are arranged between sequential edge slots in the longitudinal direction, likewise extend transversely to the longitudinal direction of the metal band, but are not guided up to the edge.

BACKGROUND OF THE INVENTION

Metal bands are in particular used in the automotive sector as inlays for sealing strips to seal openings of the engine compartment, trunk or door. The continuously produced metal bands are jacketed by rubber and/or flexible plastic and have slots in order, among other things, to permit a penetration of the sealing material with metal bands not coated with an adhesive means, since the adhesion of rubber to metal or plastic to metal is not possible. On the other hand, metal bands coated with an adhesive means are very expensive. The metal bands can be advantageously manufactured by rotary cutting of the slots and subsequent stretch rolling of the metal band, namely without waste and at a high production speed.

The metal bands are bent to a usually U-shaped clamping section, which is clamped onto the sealing flanges of the opening before or after the jacketing with the sealing material. To allow the contours of the opening to be followed in this process, the clamping section must usually be flexible both in the horizontal and in the vertical plane. In addition, the clamping section should be compressible in the longitudinal direction, since the openings to be sealed can have substantial peripheral tolerances and a cutting to length of the sealing strip on site would be extremely time-consuming and/or expensive. Sealing strips having a compressible clamping section can namely preferably be produced endlessly to the maximum length which occurs and be compressed to the actual length on installation. Bonding or vulcanizing these sealing strips together or the like therefore does not have to take place on site so that the sealing strip installation can also be carried out by robots.

On the other hand, the clamping section must also have a specific tensile strength, since the trim strips or sealing strips are usually manufactured by extrusion, with substantial forces occurring in the longitudinal direction of the band. A further requirement of the clamping section consists of exerting a clamping force which is as large as possible on the sealing flanges.

Clamping sections of the named type are manufactured in that the metal band is continuously supplied to an extruder in which the sealing material lays itself around the metal band under the effect of pressure, said metal band subsequently being pressed out of the extruder through an opening whose shape is selected in accordance with the desired profile of the sealing strip. The finished clamping section must be cut to length to the precise dimension at the spout of the extrusion line. This is carried out by cutting processes such as sawing, grinding, mechanical cutting, laser cutting or plasma cutting. The difficulty exists in this process that a clamping section which continuously exits the extruder relatively fast has to be cut to length in a discontinuous workstep. The available time for the cutting through is therefore very short. In addition, materials with different properties have to be cut through simultaneously so that a high energy input is required.

A high energy input has the result that the materials which surround the metal band such as rubber, PVC and other sealants are impaired and the metal band is exposed too much. In addition to the visual degradation of the product, the risk of injury is thereby increased, on the one hand, and the vulcanizing together of the two ends of the sealing strip is made more difficult, on the other hand. There is the risk that the metal band will corrode with sealing strips which are not vulcanized or are vulcanized badly. The energy input must therefore be reduced by complicated and/or costly cooling.

SUMMARY OF THE INVENTION

It is the underlying object of the invention to provide a metal band of the initially named kind which does not have these disadvantages. In particular the cutting to length should be facilitated and made possible with a low energy input.

This object is satisfied in that the metal band has, in addition to the edge slots and central slots, throughcuts which extend transversely to the longitudinal direction of the metal band which are provided at at least some of the central slots and extend from at least one edge of the metal band in the direction toward the tip of the respective central slot disposed opposite to the edge.

Shortened cutting lengths result for the affected central slots by the provision of additional throughcuts of the metal band. The required energy input for the cutting through of the metal band is therefore reduced at these position. The arrangement of the additional throughcuts with the central slots also has the advantage that the preferred cutting points can be located easily. It is therefore possible with a cutting procedure carried out automatically to carry it out in each case at the positions at which only a small cutting length is required. A further advantage of this arrangement of additional throughcuts consists of the fact that no dangerous sharp end sections result in the cutting of the clamping section, but that a straight cutting line is produced on both sides.

The additional throughcuts are preferably provided with each central slot. An advantageous cutting through of the clamping section can thereby take place at short intervals so that the desired length of the clamping section can be better observed.

Additional throughcuts are preferably provided starting from both edges. The remaining cutting length can thereby be further reduced.

To have to input as little energy as possible, the additional throughcuts are provided such that a non-throughcut region remains between them and the central slots which is only short. The named advantages of the metal band in accordance with the invention can thereby be further improved.

The non-throughcut regions between the additional throughcuts and the oppositely disposed tips of the central slots preferably have less than 0.5 cm. Very good results have been able to be recorded with such short, non-throughcut regions.

The edge slots are preferably arranged in pairs in that two respective edge slots disposed opposite one another are inwardly guided from the two edges of the metal band. A flexible band with high clamping force hereby results.

In accordance with an embodiment of the invention, the central slots are arranged symmetrically to the central longitudinal axis of the metal band. The clamping section is thereby given the same flexibility in both horizontal directions.

When the central slots are arranged symmetrically to the central longitudinal axis of the metal band, they are preferably made so long that they extend up to the limbs of a section bent in U shape. The flexibility of the clamping section in the two horizontal directions thereby has an advantageous size.

The extent of the central slots into the limbs of the U section is preferably short in relation to their length. A high clamping force of the section is thus ensured.

In accordance with another embodiment of the invention, the central slots are arranged symmetrically to an axis parallel to the central longitudinal axis of the metal band. A clamping profile hereby results which has a higher flexibility in a horizontal direction than in the other direction. A faulty installation of the clamping section can be advantageously prevented by this preferred bending capability.

With an asymmetric arrangement of the central slots of this type, the latter are preferably made so short that they only extend into one limb of the U section. On the one hand, the clamping force is thereby increased and, on the other hand, the difference in the flexibility in the two horizontal bending directions is large and thereby easy to determine.

The edge slots and central slots are in particular made overlapping in the transverse direction of the metal band. A high flexibility and compressibility of the clamping section hereby results.

The edge slots and the central slots preferably only overlap slightly. Too high a flexibility, and thus too low a tensile strength, can thereby be prevented.

The manufacture of the edge slots and of the central slots preferably takes place by cutting and subsequent widening by stretch rolling. Very high production speeds can thus be achieved. The manufacture is moreover possible without waste and the opening width of the slots can be varied as required. Dimensions such as the length of the slots, web width, tooth width and band width can also be set without problem.

The additional throughcuts are preferably not widened. Since the additional throughcuts are only required for the cutting process, a widening is not necessary. On the other hand, an increase in the clamping force is provided by the omission of the widening of the throughcuts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
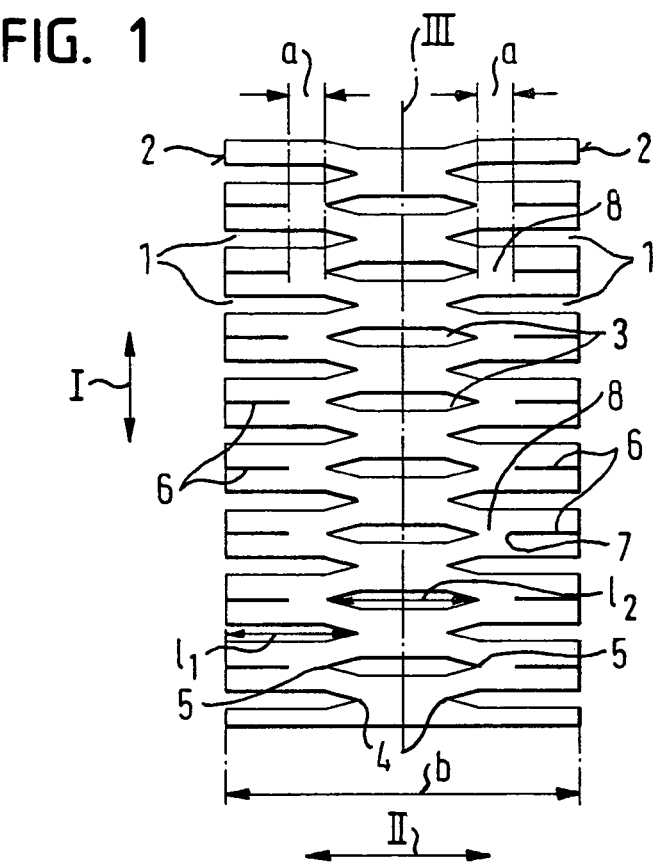
FIG. 1 illustrates a first variant of a metal band in accordance with the invention in a plan view.

The metal band which is shown in FIG. 1 and which can be used as an inlay for trim strips or sealing strips of a flexible material, in particular of rubber or plastic, has a plurality of edge slots 1 which are periodically sequential in the longitudinal direction I of the band and are inwardly guided from the two edges 2 of the metal band lying oppositely disposed to one another in pairs. The edge slots 1 have a length $l_1$ which corresponds to approximately three eighths of the width b of the metal band. The metal band furthermore has a respective central slot 3 between two respective sequential pairs of edge slots 1, the length $l_2$ of said central slot amounting to approximately half the band width b. The central slots 3 thereby overlap the edge slots 1 slightly in the transverse direction II of the metal band, namely by approximately a twelfth of the width b.

The edge slots 1 and the central slots 3 are made by cutting and stretch rolling and are thereby widened in the longitudinal direction I of the metal band. The edge slots 1 have a shape which runs out into a wedge tip 4 at the inner band side, whereas the meal slots 3 each run out in a wedge tip 5 toward the two edges of the metal band.

In addition to the edge slots 1 and the central slots 3, the metal band is provided with throughcuts 6 which extend transversely to the longitudinal direction I of the metal band and which are likewise made by cutting, but are not widened, and which each extend from an edge 2 of the metal band in the direction toward the wedge tip 5 of a central slot 3 disposed opposite the edge 2. A respective, only short, non-throughcut region 8 is disposed between the end 7 of the throughcuts 6 at the inner side of the band and the respective oppositely disposed wedge tip 5 of the central slot 3. This region in particular has an extent a in the transverse direction II of the metal band of less than 0.5 cm, in the embodiment shown of approximately 0.4 cm.

Figure 3:
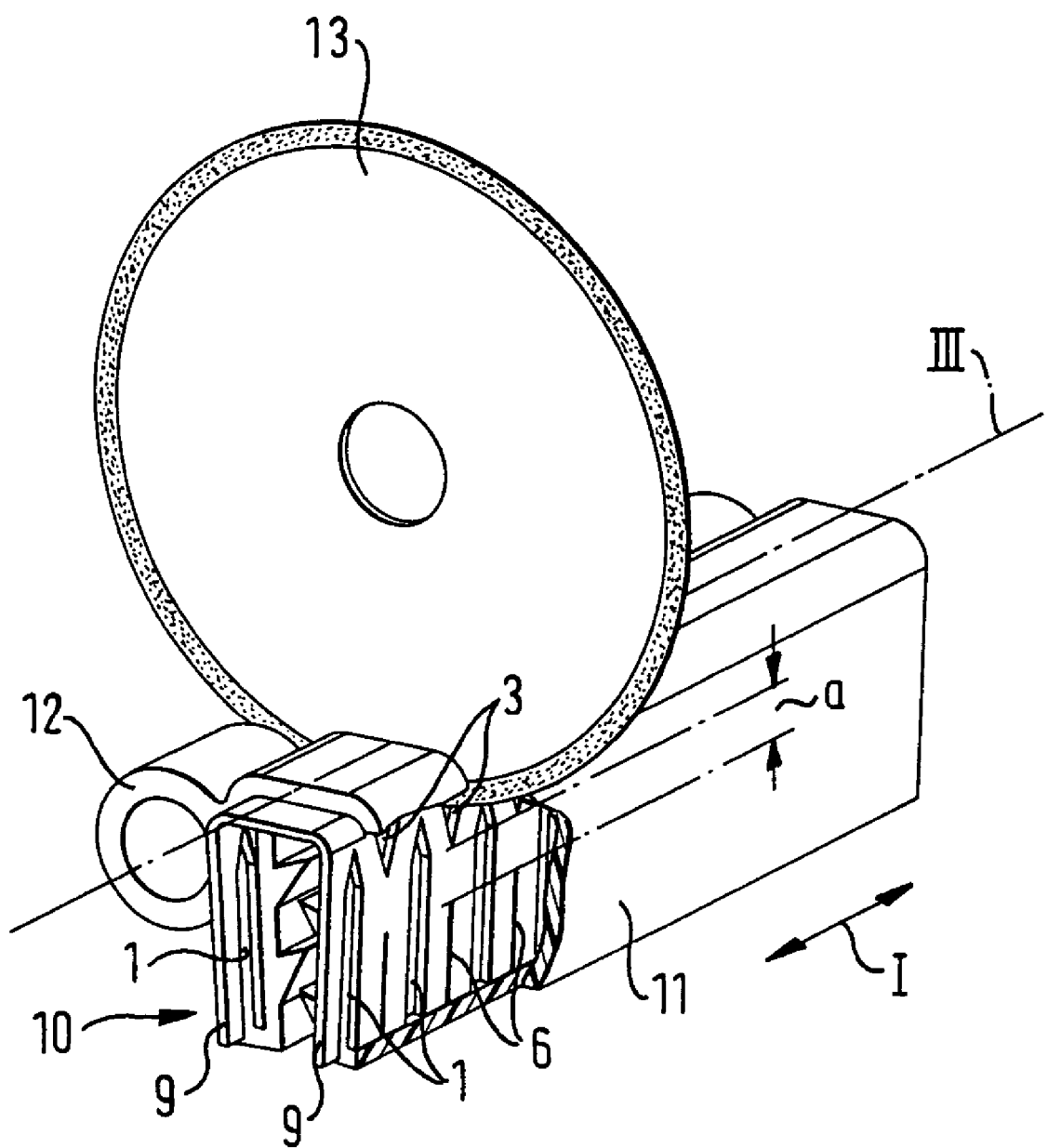
FIG. 3 is a perspective view of a clamping section with a metal band in accordance with the invention and a cutting wheel to cut through the section.

The central slots 3 are arranged symmetrical to the central longitudinal axis III of the metal band in the embodiment of FIG. 1. As shown in FIG. 3, their length $l_2$ is selected to be so large that the central slots 3 extend up to and into the limbs 9 of the U section 10 formed from the metal band. The extent of the central slots 3 into the limbs 9 of the U section 10 is, however, only short in relation to their length $l_2$.

Figure 2:
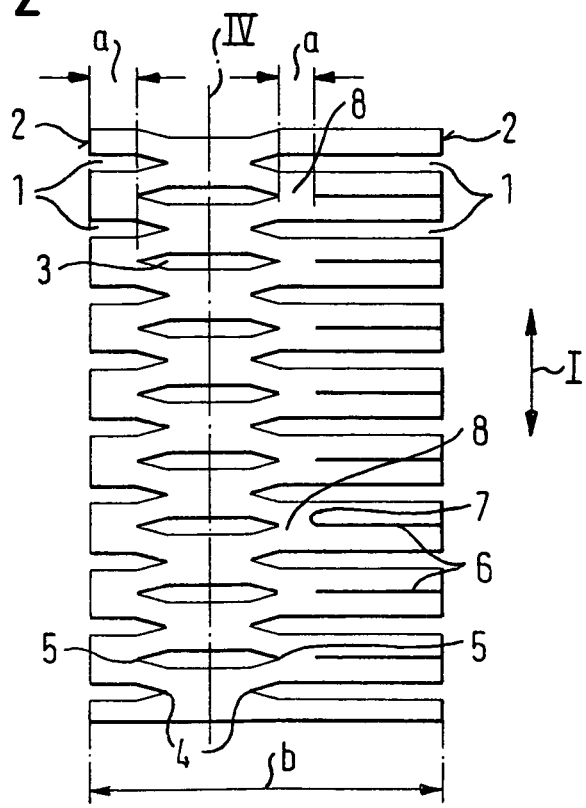
FIG. 2 illustrates a second variant of a metal band in accordance with the invention in a plan view.

In the embodiment shown in FIG. 2, the central slots 3 are not arranged symmetrically to the central longitudinal axis III of the metal band, but to a longitudinal axis IV parallel thereto. The edge slots 1 also have a length $l_1$ in this embodiment such that the edge slots only slightly overlap the central slots 3 in the transverse direction II of the metal band. Accordingly, the edge slots 1 extending from the edge at the left in FIG. 2 to the interior of the band have a lower length than the edge slots 1 extending from the edge at the right in FIG. 2 to the interior of the band. The size of the overlap corresponds to that of the embodiment of FIG. 1.

Furthermore, in this embodiment, throughcuts 6 are only provided at the side of the long edge slots 1 of the metal band, that is only starting from the right hand edge in FIG. 2. The non-throughcut region 8 between the ends 7 at the inner side of the band and the respective oppositely disposed wedge tips

5 of the central slots 3 also have an only short length a of preferably less than 0.5 cm, in particular approximately 0.4 cm in accordance with the embodiment. Due to the asymmetric arrangement of the central slots 3, the spacing of the other wedge tips 5 of the central slots 3 from the left hand edge 2 of the metal band likewise only have a small size, in particular in the embodiment shown of approximately 0.5 cm. The described advantages therefore also result on the cutting to length of this metal band without throughcuts on the left hand side of the metal band. It is, however, also possible with an asymmetric arrangement of the central slots 3 to provide throughcuts 6 on both sides of the metal band, that is starting from both edges 2.

FIG. 3 shows the cutting out of a clamping section equipped with a metal band in accordance with the invention. The metal band is bent to a U section 10 and is jacketed by a sealing material 11. The clamping section also has a sealing lip 12.

A cutting wheel 13, whose drive is not shown, is used to cut through the clamping section in the example shown. The cutting wheel can automatically be positioned at one of the central slots 3. A cutting throughth of the clamping section can thereby take place at a position at which only short, non-through out regions, namely the regions 8 between the wedge tips 5 of the central slot 3 and the two oppositely disposed throughcuts 6 are present. These regions 8 have an only short length a of approximately 0.4 cm. Only a low energy input is therefore required for the cutting through of the clamping section, whereby a low impairment of the clamping section results. In addition, smooth cut surfaces can be obtained when cutting through the clamping section in the region of a central slot 3.

The description of the invention is merely exemplary in nature and, thus, variations that do not depart from the gist of the invention are intended to be within the scope of the invention. Such variations are not to be regarded as a departure from the spirit and scope of the invention.

REFERENCE NUMERAL LIST

1 edge slot
2 edge
3 central slot
4 tip of 1
5 tip of 3
6 through
7 end of 6
8 non-throughcut region
9 limb of 10
10 U section
11 jacketing
12 sealing lip
13 cutting wheel
a length of 8
b width of the metal band
$l_1$ length of 1
$l_2$ length of 3
I longitudinal direction of the metal band
II transverse direction of the metal band
III central longitudinal axis of the metal band
IV parallel axis to III

What is claimed is:

1. A metal band inlay for trim strips or sealing strips of flexible material that is bent to form a section, the metal band having a plurality of edge slots in a longitudinal direction, the edge slots are guided inwardly from an edge of the metal band transversely to the longitudinal direction and are wedge-shaped, and central slots, that run to a tip at respective two ends, are arranged between sequential edge slots and likewise extend transversely to the longitudinal direction of the metal band, but are not guided up to the edge, wherein the metal band also includes throughcuts that extend transversely to the longitudinal direction of the metal band and between two successive edge slots that correspond to at least some of the central slots and that extend from at least one edge of the metal band in the direction toward the tip of the respective central slot disposed opposite to the edge wherein a short, non-throughcut region is present between an inner end of the throughcuts and the respective oppositely disposed tip of the central slots.

2. A metal band in accordance with claim 1, wherein the throughcuts are provided to correspond with each central slot.

3. A metal band in accordance with claim 1, wherein the throughcuts are provided along both edges.

4. A metal band in accordance with claim 1, wherein the non-throughcut region has a length of less than 0.5 cm.

5. A metal band in accordance with claim 1, wherein the edge slots are arranged in pairs in that two respective edge slots are inwardly guided from the two edges of the metal band and are disposed opposite to one another.

6. A metal band in accordance with claim 1, wherein the central slots are arranged symmetrically to a central longitudinal axis of the metal band.

7. A metal band in accordance with claim 6, wherein the central slots have a length such that, with a section bent into U shape, they extend up to and into a limb.

8. A metal band in accordance with claim 7, wherein the central slots each only extend into the limb a distance that is shorter than their length.

9. A metal band in accordance with claim 1, wherein the central slots are arranged symmetrically to an axis that is parallel to the central longitudinal axis of the metal band.

10. A metal band in accordance with claim 9, wherein the central slots only extend into one limb of the section.

11. A metal band in accordance with claim 1, wherein the edge slots and the central slots are made to overlap one another in the transverse direction of the metal band.

12. A metal band in accordance with claim 11, wherein the edge slots and the central slots overlap one another by substantially a twelfth of the width of the metal band.

13. A metal band in accordance with claim 1, wherein the edge slots and the central slots are cut and are widened by stretch rolling.

14. A metal band in accordance with claim 1, wherein the throughcuts are not widened.

* * * * *